UNITED STATES PATENT OFFICE.

CARLETON ELLIS, OF MONTCLAIR, NEW JERSEY.

COLOR CONCENTRATE FOR EDIBLE OIL OR FAT COMPOSITIONS.

1,224,910. Specification of Letters Patent. Patented May 8, 1917.

No Drawing. Application filed October 21, 1916. Serial No. 126,866.

*To all whom it may concern:*

Be it known that I, CARLETON ELLIS, a citizen of the United States, and a resident of Montclair, in the county of Essex and State of New Jersey, have invented certain new and useful Improvements in Color Concentrates for Edible Oil or Fat Compositions, of which the following is a specification.

This invention relates to butter coloring compounds or compositions and the like and relates particularly to a color concentrate or coloring agent wholly compatible with ordinary butter thereby enabling the use of such coloring composition in genuine butter without modifying the standard of the fat or throwing it open to criticism from the standpoint of adulteration.

This application is a continuation in part of my co-pending application Serial No. 67,139, filed Dec. 16, 1915.

The invention relates particularly to the use of butter fat as a vehicle and solvent for dyestuffs or coloring matter of a character adapted for use in edible fat products, including such coloring compounds as annatto, certain yellow or orange azo dyes and the like.

In preparing the coloring composition, ordinary butter, preferably as fresh as possible, may be treated in the following manner to yield an oil basis adapted for use in the preferred form of this invention.

After melting the butter fat, the liquid material is allowed to settle, until water, casein and the like have separated, when the fatty portion is decanted and centrifuged if necessary and is allowed to cool slowly to cause some portion of the stearin to separate. By careful cooling the stearin is crystallized or seeded out and the product is then pressed yielding an oil which as prepared in its preferred form remains in a substantially liquid condition at ordinary temperatures. The amount obtained ordinarily ranges from forty to fifty per cent. of the butter fat employed. The degree of pressing is regulated by the consistency of the butter and the season of the year as a rule, so as to secure a product of as uniform appearance as possible. The butter oil may then be dried to free it from the influence of moisture which tends to cause rancidity and is suitably saturated or at least heavily charged with a dyestuff or coloring matter such as annatto and the like to form a concentrate of the necessary strength and shade. This concentrate may if desired, be sterilized and packed in containers. In some cases the product may be sterilized by simple pasteurizing in sealed containers. The product is improved in stability by being charged in its container, with carbon dioxid gas, with consequent elimination of air, thus maintaining the butter oil in a non-oxidizing atmosphere.

While it is intended that the butter oil prepared in this or similar or equivalent manner represents the oily vehicle employed in the preferred form of the present invention it should be understood that the addition of various other oils as may be desired and in such quantities as desired fall within the range of possibilities hereunder although not a feature of the preferred form thereof.

Among the coloring agents which may be used are amaranth, ponceau and erythrosin for red shades. Orange 1 for orange shades, naphthol yellow S for yellow shades, while if desired green and blue shades may be obtained by light green, yellowish and indigo disulfo acid respectively.

The color of butter varies in different countries and in one locality, for example, a butter of a mahogany color is highly prized. This product may be obtained by the use of an oil concentrate containing red dyes, etc.

Butter oil is highly satisfactory both as a solvent for the coloring matter and as to its blending qualities in the butter material which is to be colored. It incorporates with butter in a highly satisfactory manner, disseminating the coloring material throughout the mass effectively. When butter oil is freed from moisture in the manner described and charged with coloring matter a product is obtained which is quite stable and which may be preserved in containers for a considerable period of time without any substantial deterioration. While butter oil of the character specified is preferably employed, it is also possible to use a butter oil or fat of a more consistent nature depending on the season of the year, etc., and in fact ordinary butter fat freed of moisture, casein, or other material tending to decompose may be used more particularly in hot summer weather when such butter fat is normally of a very soft character. When using the pressed butter fat if care is not taken to remove water and curd, the material deteriorates very rapidly. The casein-free butter or butter fat or oil preferably sterilized and charged with dyestuff to form a color concentrate, incorporated if necessary or desirable with a preservative such as common salt, sodium benzoate, carbon dioxid or alcohol and the like, tends to remain without appreciable tendency to rancidity for a considerable period, thus enabling the coloring basis to be made up in a central plant and shipped to a distance for use as may be required in the coloring of ordinary butter fat. In case the butter oil employed for the preparation of the color concentrate is not of a substantially neutral character and practically free from any butyric acid in the free state the oil may be washed with water or preferably with weak alkali (caustic soda or carbonate of soda) to remove such free acid. It should then be carefully settled and washed to remove any soaps or salts and thoroughly dried. This refining step may take place at any suitable stage in the operation of producing the color concentrate. The freedom of such butter oil from butyric acid and also apparently bodies tending to start rancidity which seemingly are removed by the washing treatment with alkali, etc., yields a butter oil of unusually good keeping qualities and such butyric acid free butter oil coloring agent is a feature of the present invention.

What I claim is:—

1. A butter color concentrate comprising the liquid constituents of butter fat freed from water and butyric acid and saturated with yellow coloring matter.

2. A butter color concentrate comprising the liquid constituents of butter fat freed from water, butyric acid and casein and saturated with yellow coloring matter.

3. A butter color concentrate comprising the liquid constituents of butter fat freed from water, butyric acid and casein and saturated with yellow coloring matter, all in a sterile condition.

4. A butter color concentrate comprising the liquid constituents of neutral butter fat substantially saturated with yellow coloring matter.

5. A butter coloring composition comprising neutral butter fats free from casein and substantially saturated with yellow coloring material.

6. A butter coloring composition comprising butyric acid free butter fats substantially saturated with yellow coloring material.

7. A butter coloring composition comprising butyric acid free butter oil substantially saturated with vegetable coloring material.

8. A butter coloring composition comprising butyric acid free butter fats substantially liquid at ordinary temperatures and heavily charged with a butter coloring dyestuff.

9. A fatty coloring composition comprising the dry liquid constituents of butter fat substantially free from butyric acid and freed from considerable quantities of the other constituents of normal butter and being highly charged with coloring matter capable of tinting fatty material to a shade approximating the color of butter.

10. A butter color concentrate comprising the butyric acid free liquid constituents only of butter fat substantially free from water and casein and at least partially freed from stearin and saturated with yellow coloring matter.

11. A butter color concentrate comprising those constituents only of butter fat which are liquid at ordinary temperatures, the same being substantially free from butyric acid, water and from casein, said material being substantially saturated with yellow coloring matter, all in a sterile condition.

12. A butter color concentrate comprising the liquid constituents only of butyric acid free butter fat substantially saturated with an oil soluble coloring matter.

13. A butter coloring composition comprising a butter fat free from butyric acid and casein and containing materially less stearin than ordinary butter, and substantially saturated with coloring material.

14. A butter coloring composition comprising at least the normally liquid constituents of butter fat substantially free from butyric acid and substantially saturated with yellow coloring material, and charged with a preservative gas.

15. A butter coloring composition comprising dry, normally substantially liquid butter oil substantially free from butyric acid in a free state and substantially saturated with vegetable coloring material.

16. A butter coloring composition comprising substantially only those oily constituents of butter that are substantially liquid at ordinary temperature, substantially free from butyric acid in a free state and heavily charged with a butter-coloring dyestuff.

17. A composition of matter liquid at ordinary temperature, containing butter-coloring in amount materially greater than in any ordinary butter of normal color, dissolved in butter oil substantially free from butyric acid in a free state.

CARLETON ELLIS.